(12) United States Patent
Payerl

(10) Patent No.: US 7,307,206 B2
(45) Date of Patent: Dec. 11, 2007

(54) STAND, PARTICULARLY FOR BONGOS

(75) Inventor: Wolfgang Payerl, Münchsteinach (DE)

(73) Assignee: Roland Meinl Musikinstrumente GmbH & Co. KG, Neustadt/Aisch (DE)

( * ) Notice: Subject to any disclaimer, the term of this patent is extended or adjusted under 35 U.S.C. 154(b) by 229 days.

(21) Appl. No.: 11/243,966

(22) Filed: Oct. 6, 2005

(65) Prior Publication Data

US 2007/0029452 A1    Feb. 8, 2007

(30) Foreign Application Priority Data

Jul. 14, 2005    (DE) ...................... 10 2005 032 776

(51) Int. Cl.
*G10D 13/02* (2006.01)
(52) U.S. Cl. ........................................ 84/421
(58) Field of Classification Search .................. 84/411, 84/421; 248/443
See application file for complete search history.

(56) References Cited

U.S. PATENT DOCUMENTS 5,797,569 A * 8/1998 Simons .................... 248/187.1

FOREIGN PATENT DOCUMENTS

DE         38 07 520 C2     9/1989

* cited by examiner

*Primary Examiner*—Kimberly Lockett
(74) *Attorney, Agent, or Firm*—Browdy and Neimark, PLLC

(57) ABSTRACT

In a stand for musical instruments arranged in pairs, in particular bongos or the like, wherein the instruments are connected by a vertical link that is fixable in a mounting clamp, which is disposed on a vertical stand, provision is made for the mounting clamp to have a configuration that is U-shaped in cross section, wherein one leg of the U is divided and incorporates an upper section that is supported pivotable relative to a lower section, wherein the upper section incorporates an offset extending downward over the pivot bearing incorporating a threaded bore into which engages a set screw that is supported on the exterior of the lower section when tightened and in this manner pivots the upper section inward, pressing it against the link to be fixed that connects the bongos.

4 Claims, 2 Drawing Sheets

STAND, PARTICULARLY FOR BONGOS

FIELD OF THE INVENTION

The invention concerns a stand for musical instruments arranged in pairs, in particular bongos or the like, wherein the instruments are connected to one another by a vertical link that is fixable in a mounting clamp, which is disposed on a vertical stand.

BACKGROUND OF THE INVENTION

A bongo stand of the generic type is known from DE 38 07 520 B1. This bongo stand has proven extremely useful in practice, however, it has certain design limitations, in that a horizontally extending traverse stay bar is provided on the vertical stand.

SUMMARY OF THE INVENTION

The invention is based on the object of improving a stand of the generic type in such a way that it permits a reliable fixing of the instruments while presenting an appealing design and being easy to manipulate.

This object is met according to the invention in such a way that the mounting clamp has a configuration that is U-shaped in cross section, wherein one leg of the U is divided and incorporates an upper section that is supported pivotable relative to a lower section, wherein the upper section incorporates an offset extending downward over the pivot bearing incorporating a threaded bore into which engages a set screw that is supported on the exterior of the lower section when tightened and in this manner pivots the upper section inward, pressing it against the link to be fixed that connects the bongos.

With the lever effect that is attainable in this manner by means of the provided pivot joint, a high degree of locking force, which ensures a reliable fixing while being easy to manipulate, can be established by means of the set screw.

Provision is advantageously made for the upper section to incorporate an L-shaped projection extending over the link, so that a defined fixing is also ensured in an upward direction.

The inside of the U-shaped mounting clamp may be provided at least in part with a friction-increasing coating, for example a rubber covering. The L-shaped projection is advantageously height adjustable relative to the upper leg section of the U by means of an elongated hole and set screw, so that an adjustment can be performed in this manner to links of different heights.

The invention will be described in more detail below based on a preferred example embodiment in conjunction with the drawing.

DESCRIPTION OF THE PREFERRED EMBODIMENT

Figure 1:
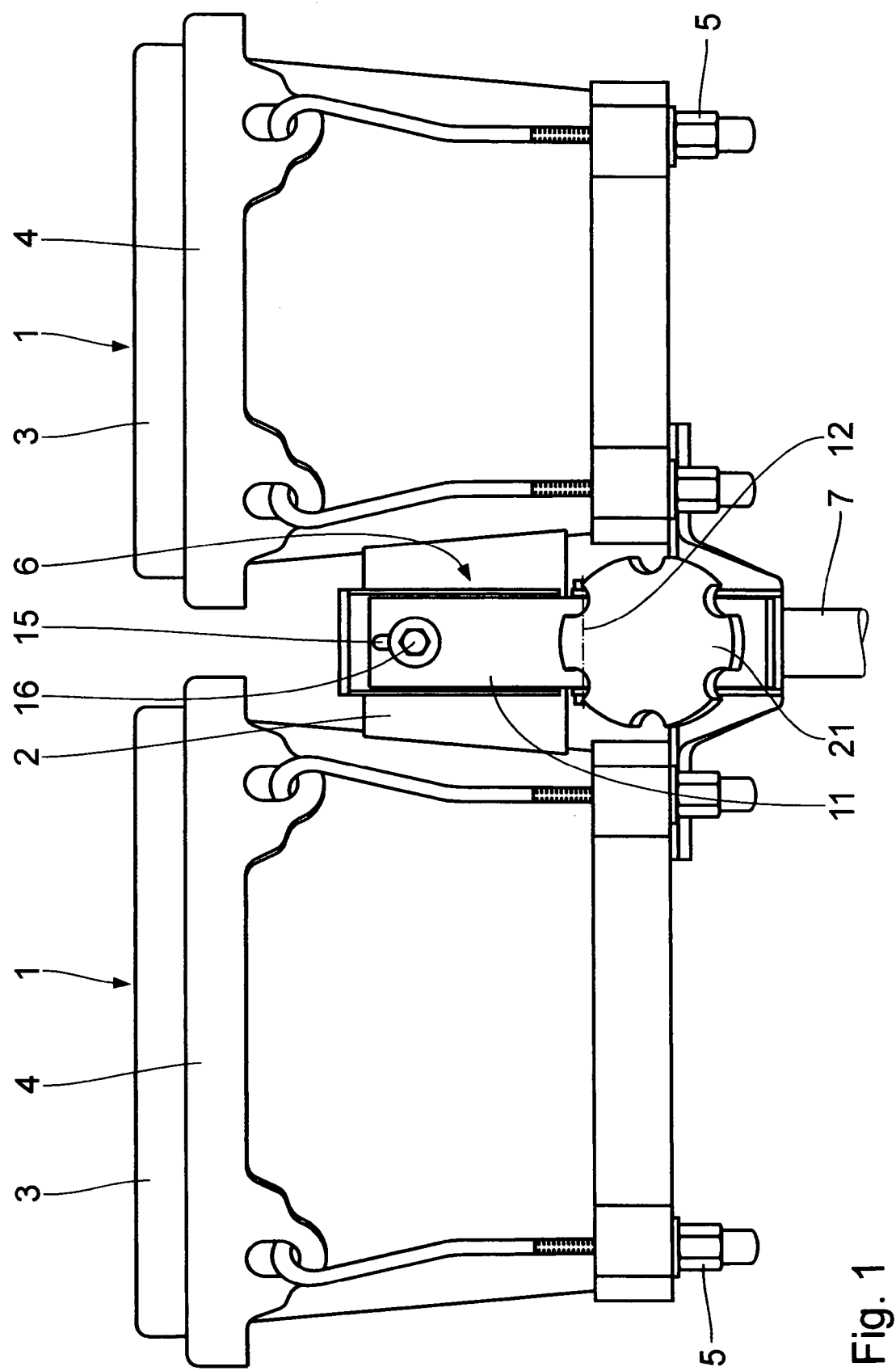
FIG. 1 shows a view of the upper portion of the stand with fixed musical instruments.

Shown in FIG. 1 are two bongos 1, which are connected to one another by means of a vertical link 2.

Each bongo 1 has, in the usual manner, a skin 3, a tension ring 4, and tension screws 5.

The bongos 1 are fixed via the link 2 to a mounting clamp 6 on the upper side of a vertical stand 7.

Figure 2:
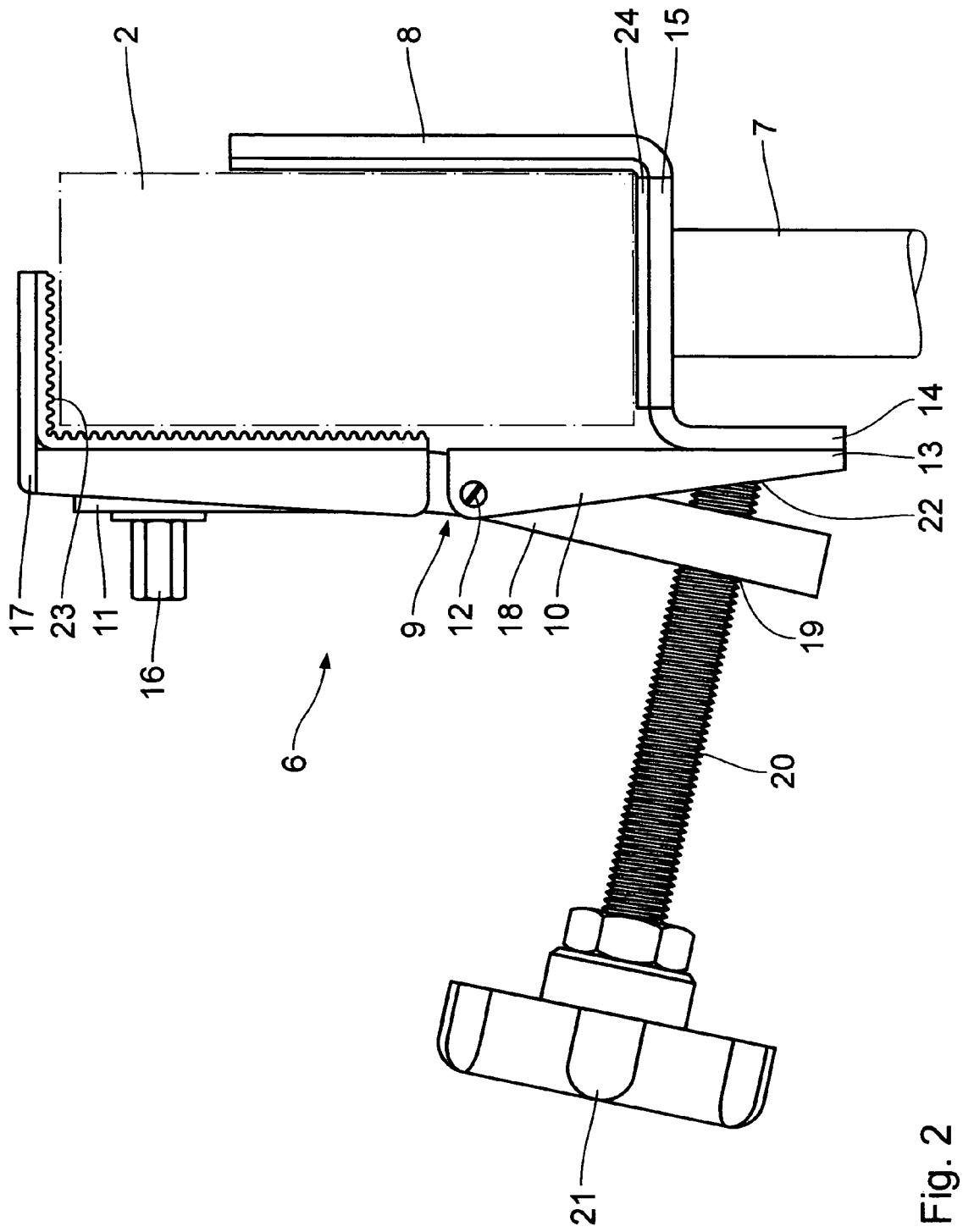
FIG. 2 shows a side view of the mounting clamp.

The mounting clamp 6, which is shown enlarged in FIG. 2, has a configuration that is substantially U-shaped in cross section and connected to the upper side of the vertical stand 7.

To this extent, a stationary leg 8 of the U-shaped configuration is provided on one side and opposite the same a two-part leg 9 of the U-shaped configuration consisting of a lower section 10 and an upper section 11, which are connected to one another by means of a pivot hinge 12.

The lower end 13 of the lower section 10 rests against a downwardly extending projection 14 of the U-shaped bottom 15 of the clamp 6.

On the upper section 11, a projection 17 with L-shaped cross section extending over the link 2 is mounted height-adjustably by means of an elongated hole 15 and set screw 16, permitting an adjustment to the height of the given link 2.

The upper projection 11 of the leg 9 of the U-shaped configuration shown on the left in the drawing has an offset 18, which extends away at a sharp angle from the lower projection 10. It is provided with a threaded bore 19 into which a set screw 20 engages with a screw head 22. The inner end 22 of the set screw 20 is supported on the lower section 10 of the leg 9 of the U-shaped configuration shown on the left in the drawing. This has the result that when the set screw 20 is tightened, the offset 18 and, therefore, the upper section 11 with the projection 17 are pushed inward, causing the link 2 to be fixed. To increase the friction, provision may also be made for the inside of the L-shaped projection 17 to be provided with a rubber coating 23 and the bottom 15 of the U-shaped configuration, and leg 8 of the U-shaped configuration shown on the right in the drawing with a corresponding rubber coating 24.

What is claimed is:

1. A stand for musical instruments arranged in pairs, in particular bongos (1) or the like, wherein the instruments are connected to one another by a vertical link (2) that is fixable in a mounting clamp (6), which is disposed on a vertical stand (7), wherein the mounting clamp (6) has a configuration that is U-shaped in cross section, wherein one leg (9) of the U is divided and incorporates an upper section (11) that is supported pivotable relative to a lower section (10), wherein the upper section (11) incorporates an offset (18) extending downward over the pivot bearing incorporating a threaded bore (19) into which engages a set screw (20) that is supported on the exterior of the lower section (10) when tightened and in this manner pivots the upper section (11) inward, pressing it against the link (2) to be fixed that connects the bongos (1).

2. A stand (7) according to claim 1, wherein the upper section (11) has an L-shaped projection (17) extending over the link.

3. A stand (7) according to claim 1, wherein the inside of the U-shaped mounting clamps is provided at least in part with a friction-increasing coating (24).

4. A stand (7) according to claim 1, wherein the L-shaped projection (17) is height adjustable relative to the upper section (11) of the leg of the U-shaped configuration by means of an elongated hole (15) and set screw (16).

* * * * *